US011449854B1

(12) United States Patent
Henderson et al.

(10) Patent No.: US 11,449,854 B1
(45) Date of Patent: Sep. 20, 2022

(54) ESTABLISHING CONSENT FOR CARDLESS TRANSACTIONS USING SHORT-RANGE TRANSMISSION (71) Applicant: Block, Inc., San Francisco, CA (US)

(72) Inventors: William Henderson, San Francisco, CA (US); Oliver S. C. Quigley, San Francisco, CA (US)

(73) Assignee: BLOCK, INC., San Francisco, CA (US)

( * ) Notice: Subject to any disclaimer, the term of this patent is extended or adjusted under 35 U.S.C. 154(b) by 285 days.

(21) Appl. No.: 14/065,760

(22) Filed: Oct. 29, 2013

Related U.S. Application Data (60) Provisional application No. 61/719,897, filed on Oct. 29, 2012.

(51) Int. Cl.
G06Q 20/32 (2012.01)

(52) U.S. Cl.
CPC .................. G06Q 20/327 (2013.01)

(58) Field of Classification Search
CPC ..................................... H04H 60/90
See application file for complete search history.

(56) References Cited

U.S. PATENT DOCUMENTS

| 4,035,614 A | 7/1977 | Frattarola et al. |
| 4,254,441 A | 3/1981 | Fisher |
| 4,591,937 A | 5/1986 | Nakarai et al. |
| 4,845,740 A | 7/1989 | Tokuyama et al. |
| 5,266,789 A | 11/1993 | Anglin et al. |
| 5,434,400 A | 7/1995 | Scherzer |
| 5,463,678 A | 10/1995 | Kepley, III et al. |
| 5,589,855 A | 12/1996 | Blumstein et al. |
| 5,764,742 A | 6/1998 | Howard et al. |
| 5,850,599 A | 12/1998 | Seiderman |
| 5,945,654 A | 8/1999 | Huang |
| 6,006,109 A | 12/1999 | Shin |
| 6,021,944 A | 2/2000 | Arakaki |
| 6,026,375 A | 2/2000 | Hall et al. |
| 6,032,859 A | 3/2000 | Muehlberger et al. |

(Continued)

FOREIGN PATENT DOCUMENTS

| AU | 2017208387 A1 | 8/2017 |
| CA | 2 919 238 A1 | 1/2015 |

(Continued)

OTHER PUBLICATIONS

Non-Final Office Action dated Aug. 7, 2009, for U.S. Appl. No. 12/050,752, of Niedermeyer, B.J., filed Mar. 18, 2008.

(Continued)

Primary Examiner — William J Jacob
(74) Attorney, Agent, or Firm — Polsinelli PC (57) ABSTRACT A method for processing a cardless payment includes receiving, by a first mobile device, a signal from a second mobile device using a short-range wireless transmission protocol. A value for the received signal strength indication of the signal between the first mobile device and the second mobile device can be determined. The process can include determining that the first mobile device and the second mobile device are in proximity based on the received signal strength indication. Consent to enter into a payment transaction can be established upon a determination that the devices are in proximity to one another.

8 Claims, 7 Drawing Sheets

(56) References Cited

U.S. PATENT DOCUMENTS

| | | | |
|---|---|---|---|
| 6,061,666 A | 5/2000 | Do et al. |
| 6,129,277 A | 10/2000 | Grant et al. |
| 6,234,389 B1 | 5/2001 | Valliani et al. |
| 6,341,353 B1 | 1/2002 | Herman et al. |
| 6,363,139 B1 | 3/2002 | Zurek et al. |
| 6,374,176 B1 | 4/2002 | Schmier et al. |
| 6,400,517 B1 | 6/2002 | Murao |
| 6,431,445 B1 | 8/2002 | DeLand et al. |
| 6,476,743 B1 | 11/2002 | Brown et al. |
| 6,481,623 B1 | 11/2002 | Grant et al. |
| 6,526,275 B1 | 2/2003 | Calvert |
| 6,536,670 B1 | 3/2003 | Postman et al. |
| 6,579,728 B2 | 6/2003 | Grant et al. |
| 6,612,488 B2 | 9/2003 | Suzuki |
| 6,659,344 B2 | 12/2003 | Otto et al. |
| 6,820,062 B1 | 11/2004 | Gupta et al. |
| 6,832,721 B2 | 12/2004 | Fujii |
| 6,850,147 B2 | 2/2005 | Prokoski et al. |
| 6,868,391 B1 * | 3/2005 | Hultgren ............... G06Q 20/02 379/145 |
| 6,888,443 B2 | 5/2005 | Ritter |
| 6,896,182 B2 | 5/2005 | Sakaguchi |
| 6,898,598 B2 | 5/2005 | Himmel et al. |
| 6,944,782 B2 | 9/2005 | von Mueller et al. |
| 6,957,334 B1 * | 10/2005 | Goldstein ............... G06F 21/33 713/170 |
| 7,003,316 B1 | 2/2006 | Elias et al. |
| 7,149,296 B2 | 12/2006 | Brown et al. |
| 7,207,480 B1 | 4/2007 | Geddes |
| 7,252,232 B2 | 8/2007 | Fernandes et al. |
| 7,309,012 B2 | 12/2007 | von Mueller et al. |
| 7,324,836 B2 | 1/2008 | Steenstra et al. |
| 7,363,054 B2 | 4/2008 | Elias et al. |
| 7,376,431 B2 | 5/2008 | Niedermeyer |
| 7,376,433 B1 | 5/2008 | Hose |
| 7,376,583 B1 | 5/2008 | Rolf |
| 7,403,762 B2 | 7/2008 | Morgan et al. |
| 7,409,234 B2 | 8/2008 | Glezerman |
| 7,433,452 B2 | 10/2008 | Taylor et al. |
| 7,506,812 B2 | 3/2009 | von Mueller et al. |
| 7,520,430 B1 | 4/2009 | Stewart et al. |
| 7,581,678 B2 | 9/2009 | Narendra et al. |
| 7,600,673 B2 | 10/2009 | Stoutenburg et al. |
| 7,620,404 B2 | 11/2009 | Chesnais et al. |
| 7,684,809 B2 | 3/2010 | Niedermeyer |
| 7,708,189 B1 | 5/2010 | Cipriano |
| 7,711,100 B2 | 5/2010 | Dennis |
| 7,793,834 B2 | 9/2010 | Hachey et al. |
| 7,810,729 B2 | 10/2010 | Morley |
| 7,848,765 B2 | 12/2010 | Phillips et al. |
| 7,869,591 B1 | 1/2011 | Nagel et al. |
| 7,896,248 B2 | 3/2011 | Morley |
| 7,918,394 B1 | 4/2011 | Morley, Jr. |
| 7,945,494 B2 | 5/2011 | Williams |
| 8,050,984 B2 | 11/2011 | Bonner et al. |
| 8,090,351 B2 | 1/2012 | Klein |
| 8,135,624 B1 | 3/2012 | Ramalingam et al. |
| 8,231,055 B2 | 7/2012 | Wen |
| 8,376,239 B1 | 2/2013 | Humphrey |
| 8,413,901 B2 | 4/2013 | Wen |
| 8,438,066 B1 | 5/2013 | Yuen et al. |
| 8,509,734 B2 | 8/2013 | Gupta et al. |
| 8,554,670 B1 | 10/2013 | Blank et al. |
| 8,684,261 B2 * | 4/2014 | Burdett ............... G06Q 20/26 235/379 |
| 8,707,319 B2 | 4/2014 | Nguyen et al. |
| 8,750,901 B1 | 6/2014 | Gupta et al. |
| 8,766,791 B2 * | 7/2014 | Koen ............... B60R 25/102 340/539.13 |
| 9,055,400 B1 | 6/2015 | Lee |
| 9,113,344 B1 | 8/2015 | Lee |
| 9,204,257 B1 * | 12/2015 | Mendelson ............... G08G 1/14 |
| 9,264,850 B1 | 2/2016 | Lee |
| 9,373,112 B1 | 6/2016 | Henderson et al. |
| 9,407,689 B1 | 8/2016 | Casares et al. |
| 9,451,397 B1 | 9/2016 | Lee |
| 9,576,289 B2 | 2/2017 | Henderson et al. |
| 9,633,352 B2 | 4/2017 | Henderson et al. |
| 9,652,791 B1 | 5/2017 | Brock |
| 9,665,858 B1 | 5/2017 | Kumar |
| 9,730,015 B1 | 8/2017 | Lee |
| 9,767,474 B1 | 9/2017 | Ramalingam et al. |
| 9,805,370 B1 | 10/2017 | Quigley et al. |
| 9,838,840 B1 | 12/2017 | Lee |
| 9,875,471 B1 | 1/2018 | Myrick et al. |
| 9,924,322 B2 | 3/2018 | Post et al. |
| 9,959,529 B1 | 5/2018 | Varma et al. |
| 10,026,083 B1 | 7/2018 | Varma et al. |
| 10,163,148 B1 | 12/2018 | Chatterjee et al. |
| 10,332,162 B1 | 6/2019 | Brock et al. |
| 10,373,151 B1 | 8/2019 | Lee |
| 10,885,522 B1 | 1/2021 | Brock |
| 2001/0001856 A1 | 5/2001 | Gould et al. |
| 2002/0002507 A1 | 1/2002 | Hatakeyama |
| 2002/0013815 A1 * | 1/2002 | Obradovich ............ H04L 67/30 709/204 |
| 2002/0030871 A1 | 3/2002 | Anderson et al. |
| 2002/0049644 A1 | 4/2002 | Kargman |
| 2002/0077974 A1 | 6/2002 | Ortiz |
| 2002/0099648 A1 | 7/2002 | DeVoe et al. |
| 2002/0108062 A1 | 8/2002 | nakajima et al. |
| 2002/0169541 A1 | 11/2002 | Bouve et al. |
| 2002/0198818 A1 | 12/2002 | Scott et al. |
| 2003/0004842 A1 | 1/2003 | Williams et al. |
| 2003/0089772 A1 | 5/2003 | Chien |
| 2003/0132300 A1 | 7/2003 | Dilday et al. |
| 2003/0135463 A1 | 7/2003 | Brown et al. |
| 2003/0144040 A1 | 7/2003 | Liu et al. |
| 2003/0194071 A1 | 10/2003 | Ramian |
| 2003/0200180 A1 | 10/2003 | Phelan et al. |
| 2004/0002897 A1 * | 1/2004 | Vishik ............... G06Q 30/02 705/14.51 |
| 2004/0012875 A1 | 1/2004 | Wood |
| 2004/0015475 A1 | 1/2004 | Scheepsma |
| 2004/0041911 A1 | 3/2004 | Odagiri et al. |
| 2004/0049451 A1 * | 3/2004 | Berardi ............... G06Q 20/00 705/39 |
| 2004/0064378 A1 | 4/2004 | Yoshida |
| 2004/0093274 A1 | 5/2004 | Vanska et al. |
| 2004/0093496 A1 | 5/2004 | Colnot |
| 2004/0104268 A1 | 6/2004 | Bailey |
| 2004/0107170 A1 | 6/2004 | Labrou et al. |
| 2004/0127256 A1 | 7/2004 | Goldthwaite et al. |
| 2004/0128256 A1 | 7/2004 | Krouse et al. |
| 2004/0193553 A1 * | 9/2004 | Lloyd ............... G06Q 20/385 705/78 |
| 2004/0204074 A1 | 10/2004 | Desai |
| 2005/0004757 A1 | 1/2005 | Neeman et al. |
| 2005/0048961 A1 | 3/2005 | Ribaudo et al. |
| 2005/0077870 A1 | 4/2005 | Ha et al. |
| 2005/0159133 A1 | 7/2005 | Hasan et al. |
| 2005/0242173 A1 | 11/2005 | Suzuki |
| 2005/0251440 A1 | 11/2005 | Bednarek |
| 2005/0256782 A1 | 11/2005 | Sands et al. |
| 2005/0266798 A1 | 12/2005 | Moloney et al. |
| 2006/0089909 A1 | 4/2006 | Mcleod et al. |
| 2006/0094481 A1 | 5/2006 | Gullickson |
| 2006/0122902 A1 | 6/2006 | Petrov et al. |
| 2006/0200378 A1 | 9/2006 | Sorensen |
| 2006/0208066 A1 | 9/2006 | Finn et al. |
| 2006/0223580 A1 | 10/2006 | Antonio et al. |
| 2006/0234771 A1 | 10/2006 | Shavrov |
| 2006/0282864 A1 * | 12/2006 | Gupte ............... H04N 21/25816 725/89 |
| 2006/0293968 A1 | 12/2006 | Brice et al. |
| 2007/0030824 A1 | 2/2007 | Ribaudo et al. |
| 2007/0067833 A1 | 3/2007 | Colnot |
| 2007/0072678 A1 | 3/2007 | Dagres |
| 2007/0100651 A1 | 5/2007 | Ramer et al. |
| 2007/0118429 A1 | 5/2007 | Subotovsky |
| 2007/0124211 A1 | 5/2007 | Smith |
| 2007/0138268 A1 | 6/2007 | Tuchman |
| 2007/0150369 A1 | 6/2007 | Zivin |
| 2007/0150414 A1 | 6/2007 | Templeton |

(56) References Cited

U.S. PATENT DOCUMENTS

| | | | |
|---|---|---|---|
| 2007/0155430 A1 | 7/2007 | Cheon et al. | |
| 2007/0221728 A1 | 9/2007 | Ferro et al. | |
| 2007/0244778 A1 | 10/2007 | Bailard | |
| 2007/0244811 A1 | 10/2007 | Tumminaro | |
| 2007/0250623 A1 | 10/2007 | Hickey et al. | |
| 2007/0255653 A1 | 11/2007 | Tumminaro et al. | |
| 2007/0282700 A1 | 12/2007 | Masse | |
| 2007/0299722 A1 | 12/2007 | Stoffelsma et al. | |
| 2008/0027815 A1 | 1/2008 | Johnson et al. | |
| 2008/0040219 A1 | 2/2008 | Kim et al. | |
| 2008/0040274 A1 | 2/2008 | Uzo | |
| 2008/0054072 A1 | 3/2008 | Katragadda et al. | |
| 2008/0059297 A1 | 3/2008 | Vallier et al. | |
| 2008/0059370 A1 | 3/2008 | Sada et al. | |
| 2008/0059375 A1 | 3/2008 | Abifaker | |
| 2008/0061150 A1* | 3/2008 | Phillips | G06K 19/07739 235/492 |
| 2008/0084977 A1 | 4/2008 | Nayak et al. | |
| 2008/0147507 A1 | 6/2008 | Langhammer | |
| 2008/0147564 A1 | 6/2008 | Singhal | |
| 2008/0177662 A1 | 7/2008 | Smith et al. | |
| 2008/0189170 A1 | 8/2008 | Ramachandra et al. | |
| 2008/0195428 A1 | 8/2008 | O'Sullivan | |
| 2008/0215380 A1 | 9/2008 | Graeber | |
| 2008/0238610 A1 | 10/2008 | Rosenberg | |
| 2008/0242278 A1 | 10/2008 | Rekimoto | |
| 2008/0249865 A1 | 10/2008 | Angell et al. | |
| 2008/0249882 A1 | 10/2008 | Spolar | |
| 2008/0249939 A1 | 10/2008 | Veenstra | |
| 2008/0277183 A1 | 11/2008 | Huang et al. | |
| 2008/0306678 A1 | 12/2008 | Miyawaki | |
| 2009/0024533 A1 | 1/2009 | Fernandes et al. | |
| 2009/0030885 A1 | 1/2009 | DePasquale et al. | |
| 2009/0043696 A1 | 2/2009 | Ornce et al. | |
| 2009/0068982 A1 | 3/2009 | Chen et al. | |
| 2009/0098908 A1 | 4/2009 | Silverbrook et al. | |
| 2009/0100168 A1 | 4/2009 | Harris | |
| 2009/0104920 A1 | 4/2009 | Moon et al. | |
| 2009/0117883 A1 | 5/2009 | Coffing et al. | |
| 2009/0119190 A1 | 5/2009 | Realini | |
| 2009/0132413 A1* | 5/2009 | Engelbrecht | G06Q 20/02 705/40 |
| 2009/0159681 A1 | 6/2009 | Mullen et al. | |
| 2009/0166422 A1 | 7/2009 | Biskupski | |
| 2009/0171844 A1 | 7/2009 | Olliphant et al. | |
| 2009/0210334 A1 | 8/2009 | Russell | |
| 2009/0216676 A1 | 8/2009 | Mathur et al. | |
| 2009/0287408 A1 | 11/2009 | Gerdes et al. | |
| 2009/0298514 A1 | 12/2009 | Ullah | |
| 2009/0328052 A1 | 12/2009 | Nguyen et al. | |
| 2010/0057503 A1 | 3/2010 | Katz | |
| 2010/0063893 A1 | 3/2010 | Townsend | |
| 2010/0087144 A1 | 4/2010 | Korenshtein | |
| 2010/0125495 A1 | 5/2010 | Smith et al. | |
| 2010/0131764 A1* | 5/2010 | Goh | H04L 9/321 713/171 |
| 2010/0135178 A1 | 6/2010 | Aggarwal et al. | |
| 2010/0144375 A1 | 6/2010 | Pfister et al. | |
| 2010/0145868 A1 | 6/2010 | Niedermeyer | |
| 2010/0184479 A1 | 7/2010 | Griffin | |
| 2010/0191653 A1 | 7/2010 | Johnson et al. | |
| 2010/0197325 A1 | 8/2010 | Dredge | |
| 2010/0243732 A1 | 9/2010 | Wallner | |
| 2010/0287250 A1* | 11/2010 | Carlson | G06Q 30/02 709/206 |
| 2010/0306080 A1 | 12/2010 | Trandal et al. | |
| 2010/0328029 A1* | 12/2010 | Kolek | G06F 21/35 340/5.9 |
| 2011/0045840 A1 | 2/2011 | Alizadeh-Shabdiz et al. | |
| 2011/0047037 A1 | 2/2011 | Wu | |
| 2011/0060600 A1 | 3/2011 | Fox et al. | |
| 2011/0063138 A1 | 3/2011 | Berkobin et al. | |
| 2011/0084131 A1 | 4/2011 | McKelvey | |
| 2011/0084139 A1 | 4/2011 | McKelvey et al. | |
| 2011/0084147 A1 | 4/2011 | Wilson et al. | |
| 2011/0090124 A1 | 4/2011 | Liu et al. | |
| 2011/0137773 A1 | 6/2011 | Davis, III et al. | |
| 2011/0137803 A1 | 6/2011 | Willins | |
| 2011/0153495 A1 | 6/2011 | Dixon et al. | |
| 2011/0161235 A1 | 6/2011 | Beenau et al. | |
| 2011/0180601 A1 | 7/2011 | Morley | |
| 2011/0198395 A1 | 8/2011 | Chen | |
| 2011/0202393 A1 | 8/2011 | DeWakar et al. | |
| 2011/0202463 A1 | 8/2011 | Powell | |
| 2011/0208612 A1 | 8/2011 | Shader et al. | |
| 2011/0213652 A1 | 9/2011 | Gillen et al. | |
| 2011/0238476 A1 | 9/2011 | Carr et al. | |
| 2011/0238517 A1* | 9/2011 | Ramalingam | H04W 4/029 705/26.1 |
| 2011/0249668 A1 | 10/2011 | Van Milligan et al. | |
| 2011/0258120 A1 | 10/2011 | Weiss | |
| 2012/0005096 A1 | 1/2012 | Dorsey et al. | |
| 2012/0008851 A1 | 1/2012 | Pennock et al. | |
| 2012/0012653 A1 | 1/2012 | Johnson et al. | |
| 2012/0052874 A1 | 3/2012 | Kumar | |
| 2012/0052910 A1 | 3/2012 | Mu et al. | |
| 2012/0101942 A1 | 4/2012 | Park | |
| 2012/0109781 A1 | 5/2012 | Felt et al. | |
| 2012/0115512 A1 | 5/2012 | Grainger et al. | |
| 2012/0116861 A1* | 5/2012 | Dobyns | G06Q 30/0234 705/14.34 |
| 2012/0128089 A1 | 5/2012 | Tsutsui | |
| 2012/0130895 A1* | 5/2012 | Granbery | G06Q 20/10 705/44 |
| 2012/0149390 A1 | 6/2012 | Gravely et al. | |
| 2012/0158500 A1 | 6/2012 | Hochstatter et al. | |
| 2012/0166267 A1 | 6/2012 | Beatty et al. | |
| 2012/0195295 A1 | 8/2012 | Elmaleh | |
| 2012/0209686 A1 | 8/2012 | Horowitz et al. | |
| 2012/0209773 A1* | 8/2012 | Ranganathan | G06Q 20/40 705/44 |
| 2012/0235812 A1 | 9/2012 | Maia et al. | |
| 2012/0252500 A1 | 10/2012 | Mitsuya et al. | |
| 2012/0278150 A1 | 11/2012 | Chen | |
| 2012/0278172 A1* | 11/2012 | Mercuri | G06Q 30/02 705/14.58 |
| 2012/0296724 A1 | 11/2012 | Faro et al. | |
| 2012/0303425 A1 | 11/2012 | Katzin et al. | |
| 2012/0310760 A1 | 12/2012 | Phillips et al. | |
| 2013/0002840 A1 | 1/2013 | Toney et al. | |
| 2013/0024018 A1 | 1/2013 | Chang et al. | |
| 2013/0027227 A1 | 1/2013 | Nordstrom | |
| 2013/0030931 A1 | 1/2013 | Moshfeghi | |
| 2013/0054281 A1 | 2/2013 | Thakkar et al. | |
| 2013/0073365 A1 | 3/2013 | Mccarthy | |
| 2013/0079037 A1* | 3/2013 | Dobyns | H04W 4/023 455/456.3 |
| 2013/0080289 A1 | 3/2013 | Roy et al. | |
| 2013/0110659 A1* | 5/2013 | Phillips | G06Q 20/0453 705/24 |
| 2013/0132274 A1* | 5/2013 | Henderson | G06Q 20/3224 705/41 |
| 2013/0144715 A1 | 6/2013 | Kranzley et al. | |
| 2013/0157685 A1 | 6/2013 | Young | |
| 2013/0185123 A1 | 7/2013 | Krivopaltsev et al. | |
| 2013/0191195 A1 | 7/2013 | Carlson et al. | |
| 2013/0217332 A1* | 8/2013 | Altman | H04H 60/90 455/41.2 |
| 2013/0217333 A1* | 8/2013 | Sprigg | G06Q 30/0207 455/41.2 |
| 2013/0226800 A1 | 8/2013 | Patel et al. | |
| 2013/0238540 A1 | 9/2013 | O'Donoghue et al. | |
| 2013/0268378 A1 | 10/2013 | Yovin | |
| 2013/0282438 A1* | 10/2013 | Hunter | G01S 1/02 705/7.32 |
| 2013/0297422 A1* | 11/2013 | Hunter | G06Q 30/0261 705/14.58 |
| 2013/0304898 A1 | 11/2013 | Aggarwal et al. | |
| 2014/0028440 A1 | 1/2014 | Takeuchi et al. | |
| 2014/0052615 A1* | 2/2014 | Andersen | G06Q 20/32 705/39 |
| 2014/0068719 A1 | 3/2014 | Kiukkonen et al. | |

(56) References Cited

U.S. PATENT DOCUMENTS

| | | | |
|---|---|---|---|
| 2014/0123043 A1 | 5/2014 | Schmidt et al. | |
| 2014/0149282 A1* | 5/2014 | Philliou | G06Q 20/204 705/39 |
| 2014/0179340 A1 | 6/2014 | Do et al. | |
| 2014/0187257 A1 | 7/2014 | Emadzadeh et al. | |
| 2014/0370879 A1* | 12/2014 | Redding | H04M 3/42178 455/419 |
| 2015/0006308 A1 | 1/2015 | Lin | |
| 2015/0031388 A1 | 1/2015 | Chatterjee et al. | |
| 2015/0079942 A1 | 3/2015 | Kostka et al. | |
| 2015/0126119 A1 | 5/2015 | Schulz et al. | |
| 2015/0178698 A1 | 6/2015 | Schulz et al. | |
| 2016/0019531 A1* | 1/2016 | Gormley | G06Q 20/405 705/72 |
| 2016/0210606 A1 | 7/2016 | Henderson et al. | |
| 2016/0259616 A1 | 9/2016 | Hosein et al. | |
| 2018/0227712 A1 | 8/2018 | Post et al. | |

FOREIGN PATENT DOCUMENTS

| | | | |
|---|---|---|---|
| EP | 2 506 642 A1 | 10/2012 | |
| JP | 2004-078662 A | 3/2004 | |
| JP | 2005-269172 A | 9/2005 | |
| KR | 10-0452161 B1 | 10/2004 | |
| KR | 10-2005-0077659 A | 8/2005 | |
| KR | 10-2008-0039330 A | 5/2008 | |
| WO | 01/65827 A2 | 9/2001 | |
| WO | 2010/097711 A2 | 9/2010 | |
| WO | 2010/135174 A1 | 11/2010 | |
| WO | WO2011127627 A1 * | 10/2011 | |
| WO | 2013/009891 A1 | 1/2013 | |
| WO | 2015/013170 A1 | 1/2015 | |

OTHER PUBLICATIONS

Notice of Allowance dated Dec. 16, 2009, for U.S. Appl. No. 12/050,752, of Niedermeyer, B.J., filed Mar. 18, 2008.
Non-Final Office Action dated Sep. 10, 2010, for U.S. Appl. No. 12/707,228, of Niedermeyer, B J., filed Feb. 17, 2010.
Final Office Action dated Mar. 31, 2011, for U.S. Appl. No. 12/707,228, of Niedermeyer, B.J., filed Feb. 17, 2010.
Non-Final Office Action dated Oct. 10, 2012, for U.S. Appl. No. 13/179,832, of Dorsey, J., et al., filed Jul. 11, 2011.
Final Office Action dated Jun. 27, 2013, for U.S. Appl. No. 13/179,832, of Dorsey, J., et al., filed Jul. 11, 2011.
Advisory Action dated Oct. 24, 2013, for U.S. Appl. No. 13/179,832, of Dorsey, J., et al., filed Jul. 11, 2011.
Non-Final Office Action dated Jan. 8, 2014, for U.S. Appl. No. 13/179,832, of Dorsey, J., et al., filed Jul. 11, 2011.
Non Final Office Action dated Dec. 1, 2014, for U.S. Appl. No. 13/802,064, of Lee, B., filed Mar. 13, 2013.
Notice of Allowance dated Feb. 6, 2015, for U.S. Appl. No. 13/802,290, of Lee, B., filed Mar. 13, 2013.
Final Office Action dated Mar. 20, 2015, for U.S. Appl. No. 13/802,064, of Lee, B., filed Mar. 13, 2013.
Notice of Allowance dated Apr. 13, 2015, for U.S. Appl. No. 13/801,340, of Lee, B., filed Mar. 13, 2013.
Non Final Office Action dated Oct. 1, 2015, for U.S. Appl. No. 14/803,850, of Lee, B., filed Jul. 20, 2015.
Notice of Allowance dated Oct. 13, 2015, for U.S. Appl. No. 13/802,064, of Lee, B., filed Mar. 13, 2013.
Non-Final Office action dated Oct. 19, 2015, for U.S. Appl. No. 13/948,871, of Post, J.D., et al., filed Jul. 23, 2013.
Non Final Office Action dated Jan. 13, 2016, for U.S. Appl. No. 14/726,165, of Lee, B., filed May 29, 2015.
Notice of Allowance dated May 12, 2016, for U.S. Appl. No. 14/726,165, of Lee, B., filed May 29, 2015.
Final Office action dated May 17, 2016, for U.S. Appl. No. 13/948,871, of Post, J.D., et al., filed Jul. 23, 2013.
Final Office Action dated Jul. 22, 2016, for U.S. Appl. No. 14/803,850, of Lee, B., filed Jul. 20, 2015.
Non-Final Office Action dated Jul. 29, 2016, for U.S. Appl. No. 14/079,320, of Chatterjee, S., et al., filed Nov. 13, 2013.
Examination Report No. 1 for Australian Patent Application No. 2014293388, dated Aug. 2, 2016.
Advisory Action dated Sep. 1, 2016, for U.S. Appl. No. 13/948,871, of Post, J.D., et al., filed Jul. 23, 2013.
Non-Final Office Action dated Sep. 28, 2016, for U.S. Appl. No. 14/042,366, of Brock, Z., et al., filed Sep. 30, 2013.
Non-Final Office action dated Dec. 16, 2016, for U.S. Appl. No. 13/948,871, of Post, J.D., et al., filed Jul. 23, 2013.
Examiner Requisition for Canadian Patent Application No. 2,919,238, dated Feb. 6, 2017.
Non Final Office Action dated Mar. 1, 2017, for U.S. Appl. No. 14/941,020, of Lee, B., filed Nov. 13, 2015.
Non-Final Office Action dated Apr. 4, 2017, for U.S. Appl. No. 15/269,865, of Lee, B., filed Sep. 19, 2016.
Notice of Allowance dated Apr. 7, 2017, for U.S. Appl. No. 14/803,850, of Lee, B., filed Jul. 20, 2015.
Final Office Action dated Apr. 11, 2017, for U.S. Appl. No. 14/079,320, of Chatterjee, S., et al., filed Nov. 13, 2013.
Non-Final Office Action dated May 4, 2017, for U.S. Appl. No. 15/084,390, of Henderson, W., et al., filed Mar. 29, 2016.
Advisory Action dated Jul. 20, 2017, for U.S. Appl. No. 14/079,320, of Chatterjee, S., et al., filed Nov. 13, 2013.
Final Office action dated Jul. 20, 2017, for U.S. Appl. No. 13/948,871, of Post, J.D., et al., filed Jul. 23, 2013.
Notice of Allowance dated Jul. 25, 2017, for U.S. Appl. No. 15/269,865, of Lee, B., filed Sep. 19, 2016.
Final Office Action dated Sep. 27, 2017, for U.S. Appl. No. 14/941,020, of Lee, B., filed Nov. 13, 2015.
Advisory Action dated Oct. 5, 2017, for U.S. Appl. No. 13/948,871, of Post, J.D., et al., filed Jul. 23, 2013.
Non-Final Office Action dated Oct. 6, 2017, for U.S. Appl. No. 14/079,320, of Chatterjee, S., et al., filed Nov. 13, 2013.
Final Office Action dated Oct. 18, 2017, for U.S. Appl. No. 15/084,390, of Henderson, W., et al., filed Mar. 29, 2016.
Notice of Allowance dated Nov. 6, 2017, for U.S. Appl. No. 13/948,871, of Post, J.D., et al., filed Jul. 23, 2013.
Advisory Action dated Jan. 4, 2018, for U.S. Appl. No. 14/941,020, of Lee, B., filed Nov. 13, 2015.
Final Office Action dated Jan. 8, 2018, for U.S. Appl. No. 14/042,366, of Brock, Z., et al., filed Sep. 30, 2013.
Examiner Requisition for Canadian Patent Application No. 2,919,238, dated Feb. 9, 2018.
Final Office Action dated Feb. 22, 2018, for U.S. Appl. No. 14/079,320, of Chatterjee, S., et al., filed Nov. 13, 2013.
Examination Report No. 1 for Australian Patent Application No. 2017208387, dated Feb. 26, 2018.
Non-Final Office Action dated Mar. 22, 2018, for U.S. Appl. No. 14/941,020, of Lee, B., filed Nov. 13, 2015.
Advisory Action dated May 15, 2018, for U.S. Appl. No. 14/042,366, of Brock, Z., et al., filed Sep. 30, 2013.
International Search Report and Written Opinion for International Application No. PCT/US2012/046282, dated Oct. 4, 2012.
International Search Report and Written Opinion for International Application No. PCT/US2014/047381 dated Nov. 25, 2014.
Burke, R.R., "The Third Wave of Marketing Intelligence," Retailing in the 21st Century: Current and Future Trends, pp. 103-115 (2010).
Chediak, M., "Retail technology; Grocers get taste of future; Store owners who want to stand out in the crowd these days are embracing cutting-edge services," The Orlando Sentinel, pp. 1-2 (Jan. 21, 2006).
Shekar, S., et al., "iGrocer—A Ubiquitous and Pervasive Smart Grocery Shopping System," Proceedings of the 2003 ACM Symposium on Applied Computing, pp. 645-652 (Mar. 9, 2003).
Non-Final Office Action dated May 16, 2018, for U.S. Appl. No. 15/084,390, of Henderson, W., et al., filed Mar. 29, 2016.
Non-Final Office Action dated Jun. 25, 2018, for U.S. Appl. No. 14/042,366, of Brock, Z., et al., filed Sep. 30, 2013.
Notice of Allowance dated Aug. 8, 2018, for U.S. Appl. No. 14/079,320, of Chatterjee, S., et al., filed Nov. 13, 2013.

(56) References Cited

OTHER PUBLICATIONS

"2.5mm Headset Jack," Retrieved from the Internet URL: http://www.phonescoop.com/glossary/term.php?gid=360, on May 5, 2011, pp. 1-1.
"A Magnetic Stripe Reader—Read Credit Cards & Driver Licences!," Articlesbase (articlesbase.com), Sep. 7, 2009, Retrieved from the Internet URL: http://www.articlesbase.com/electronics-articles/a-magnetic-stripe-reader-read-credit-cards- . . . , on Feb. 8, 2011, pp. 1-3.
"Announcement: Semtek Introduces Side Swipe II Card Reader for Wireless Devices," Brighthand, Retrieved from the Internet URL: http://forum.brighthand.com/pdas-handhelds/173285-announcement-semtek-introduces-SID . . . , on Apr. 19, 2011, pp. 1-2.
"Arduino magnetic stripe decoder," Instructables, Retrieved from the Internet URL: http://www.instructables.com/id/Arduino-magneticstripe-decoder/, on Feb. 8, 2011, pp. 1-5.
"Barcode scanner and Magnetic Stripe Reader (MSR) for Pocke . . . ," Tom's Hardware (tomshardware.com), Retrieved from the Internet URL: http://www.tomshardware.com/forum/24068-36-barcode-scanner-magnetic-stripe-reader-po . . . , on Feb. 8, 2011, pp. 1-2.
"Credit Card Swiper and Reader for iPhone, iPad, Blackberry, Android and more," Retrieved from the Internet URL: http://hubpages.com/hub/Credit-Card-Swiper-and-Reader-for-iPhone-iPad-Blackberry-An . . . , on Apr. 20, 2011, pp. 1-2.
"Get paid on the spot from your mobile phone," Retrieved from the Internet URL: http://payments.intuit.com/products/basic-payment-solutions/mobile-credit-card-processin . . . , on Feb. 11, 2011, pp. 1-3.
"Headphone Jack (3.5mm)," Retrieved from the Internet URL: http://www.phonescoop.com/glossary/term.php?gid=440, on May 5, 2011, pp. 1-1.
"Magnetic Card Reader," lekernel.net~scrapbook. Retrieved from the Internet URL: http://lekernel.net/scrapbook/old/cardreader.html, on Apr. 25, 2011, pp. 1-4.
"Magnetic Stripe Reader (MSR) MSR7000-100R," Motorola Solutions, Retrieved from the Internet URL: http://www.motorola.com/business/US-EN/MSR7000-100R_US-EN.do?vgnextoid=164fc3 . . . , on Feb. 8, 2011, pp. 1-1.
"Magnetic stripe reader/writer," Retrieved from the Internet URL: http://www.gae.ucm.es/-padilla/extrawork/stripe.html, on Dec. 21, 2009, pp. 1-2.
"Mag-stripe readers The hunt for a homebrew mag-stripe reader that'll work with modern," Jan. 16, 2009, Retrieved from the Internet URL: http://www.hak5.org/forums/index.php?showtopic=11563&st=20, on Apr. 25, 2011, pp. 1-6.
"Mophie Marketplace Magnetic Strip Reader/Case for iPhone 3G & 3GS—Grey," J&R (JR.com), Retrieved from the Internet URL: http://www.jr.com/mophie/pe/MPE_MPIP3GBLK/, on Feb. 8, 2011, pp. 1-1.
"MSR500EX (Mini123EX) Portable Magnetic Stripe Card Reader," TYNER, Apr. 27, 2007, Retrieved from the Internet URL: http://www.tyner.com/magnetic/msr500ex.htm, on Apr. 22, 2011, pp. 1-3.
"Pay@PC," Retrieved from the Internet URL: http://www.merchantanywhere.com/PAY_AT_PCT@PC.htm, on Feb. 11, 2011, pp. 1-2.
"Reference Designations for Electrical and Electronics Parts and Equipment, Engineering Drawing and Related Documentation Practices," ASME Y14.44-2008, The American Society of Mechanical Engineers, Nov. 21, 2008, pp. 1-31.
"Semtek 3913 Insert Magnetic Card Reader 20 Pin Serial RS232," Product description, RecycledGoods.com, Retrieved from the Internet URL: http://www.recycledgoods.com/products/Semtek-3913-Insert-Magnetic-Card-Reader-20-Pi . . . , on Apr. 19, 2011, pp. 1-3.
"Semtek to target healthcare with HandEra PDAs and PDA swipe card reader," Aug. 29, 2001, Retrieved from the Internet URL: http://www.pdacortex.com/semtek.htm, on Apr. 19, 2011, pp. 1-2.
"Touch-Pay Wireless Credit Card Processing," MerchantSeek, Retrieved from the Internet URL: http://www.merchantseek.com/wireless-credit-card-processing.htm, on Feb. 11, 2011, pp. 1-5.
"Travel industry targeted for Palm PDA card reader," Retrieved from the Internet URL: http://www.m-travel.com/news/2001/08/travel_industry.html, on Apr. 19, 2011, pp. 1-2.
"Uber—Android Apps on Google Play," dated Nov. 10, 2014, Retrieved from the internet URL: https://play.google.com/store/apps/details?id=com.ubercab&hl=en, on Nov. 12, 2014, pp. 2.
"USB Magnetic Stripe Credit/Card Track-2 Reader and Writer (75/210BPI)," Deal Extreme (dealextreme.com), Nov. 15, 2008, Retrieved from the Internet URL: http://www.dealextreme.com/p/usb-magnetic-stripe-credit-debit-card-track-2-reader-and-wr . . . , on Feb. 8, 2011, pp. 1-3.
Acidus, "Mag-stripe Interfacing—A Lost Art," Retrieved from the Internet URL: http://www.scribd.com/doc/18236182/Magstripe-Interfacing#open_ . . . , on Feb. 7, 2011, pp. 1-4.
Bauer, G.R. et al., "Comparing Block Cipher Modes of Operation on MICAz Sensor Nodes," 17th Euromicro International Conference on Parallel, Distributed and Network-based Processing, 2009, Feb. 18-20, 2009, pp. 371-378.
Bourdeauducq, S., "Reading magnetic cards (almost) for free" ("Lekernel"), Jan. 26, 2009, Retrieved from the Internet URL: http://lekernel.net/blog/?p=12, on May 5, 2011, pp. 1-2.
Buttell, A.E., "Merchants eye mobile phones to transact card payments," Feb. 3, 2010, Retrieved from the Internet URL: http://www.merchantaccountguide.com/merchant-account-news/cell-phone-credit-card-mer . . . , on Feb. 8, 2011, pp. 1-3.
Finzgar et. al.; "Use of NFC and QR code identification in an electronic ticket system for public transport"; Published in SoftCOM 2011, 19th International Conference on Software, Telecommunications and Computer networks; Published Nov. 1, 2011 (Year: 2011).
Goode, L., "Paying With Square's New Mobile-Payments App," All Things D., published on Apr. 30, 2012, Retrieved from the Internet URL: http://allthingsd.com/20120430/paying-with-squares-new-mobile-payments-app/, on Nov. 7, 2014, pp. 1-3.
Grandison, K., "vTerminal Credit Card Processing App for Authorize Net and PayPal Payflow Pro for Curve 8350 8500 8900 and Bold 9000," Retrieved from the Internet URL: http://www.4blackberry.net/tag/business-tools/vterminal-credit-card-processing-app-for-authorizenet-and-paypal-payflow-pro-for-curve-8350-8500-890-download-2075.html, on Mar. 30, 2015, pp. 1-4.
Hachman, M., "MobilePay: Your Phone Is Your Credit Card," dated Sep. 28, 2010, Retrieved from the Internet URL: http://www.pcmag.com/article2/0,2817,2369877,00.asp, on Sep. 25, 2013, p. 1.
Harris, A., "Magnetic Stripe Card Spoofer," Aug. 4, 2008, Retrieved from the Internet URL: http://hackaday.com/2008/08/04/magnetic-stnpe-card-spoofer/, on Apr. 25, 2011, pp. 1-11.
Jones, R., "U.S. Credit Cards to get a high-tech makeover," Oct. 22, 2010, Retrieved from the Internet URL: http://lifeine.today.com/_news/2010/10/22/5334208-us-credit-cards-to-get-a-high-tech-mak . . . , on Feb. 8, 2011, pp. 1-8.
Kuo, Y-S et al., "Hijacking Power and Bandwidth from the Mobile Phone's Audio Interface," Proceedings of the First ACM Symposium on Computing for Development, (DEV'10), Dec. 17, 2010, pp. 1-10.
Lucks, S., "Two-Pass Authenticated Encryption Faster than Generic Composition," H. Gilbert and H. Handschuh (Eds.): FSE 2005, LNCS 3557, © International Association for Cryptologic Research 2005, pp. 284-298.
Padilla, L. "The simplest magnetic stripe reader," Jan. 27, 2003, Retrieved from the Internet URL: www.gae.ucm.esi~padilla/extrawork/soundtrack.html, on Dec. 21, 2009, pp. 1-5.
Padilla, L., "Magnetic stripe reader circuit," Jan. 28, 1997, Retrieved from the Internet URL: http://www.gae.ucm.es/~padilla/extraworkImagamp.html, on May 5, 2011, pp. 1-7.
Padilla, L., "Turning your mobile into a magnetic stripe reader," Retrieved from the Internet URL: http://www.gae.ucm.es/~padilla/extrawork/mobilesoundtrack.html, on Feb. 7, 2011, pp. 1-4.
Siegler, MG., "MobilePay May Be the Death of the Wallet. Yes, for Real This Time," TechCrunch, dated Sep. 28, 2010, Retrieved from the internet URL: http://techcrunch.com/2010/09/28/mobilepayusa/, on Sep. 22, 2013, pp. 12.

(56) References Cited

OTHER PUBLICATIONS

Titlow, J.P., "ROAM pay is like Square for Blackberry (Plus Android, iOS and Desktops)," Dec. 1, 2010, Retrieved from the Internet URL: http://www.readwriteweb.com/biz/2010/12/roampay-is-like-square-for-bla.php, on Apr. 20, 2011, pp. 1-12.
Veneziani, V., "Use a cellphone as a magnetic card reader," Apr. 15, 2005, Retrieved from the Internet URL: http://hackaday.com/2005/04/15/use a-cellphone-as-a-magnetic-card . . . , on Feb. 7, 2011, pp. 1-10.
Website: www.alexwinston.com, Aug. 31, 2009, pp. 1-5.
Final Office Action dated Oct. 30, 2018, for U.S. Appl. No. 14/941,020, of Lee, B., filed Nov. 13, 2015.
Examination Report No. 2 for Australian Patent Application No. 2017208387, dated Nov. 9, 2018.
Non-Final Office Action dated Dec. 13, 2018, for U.S. Appl. No. 15/909,005, of Post, J.D., et al., filed Mar. 1, 2018.
Final Office Action dated Dec. 13, 2018, for U.S. Appl. No. 15/084,390, of Henderson, W., et al., filed Mar. 29, 2016.
Examiner Requisition for Canadian Patent Application No. 2,919,238, dated Dec. 20, 2018.
Non-Final Office Action dated Dec. 31, 2018, for U.S. Appl. No. 15/445,380, of Brock, Z., filed Feb. 28, 2017.
Notice of Allowance dated Feb. 4, 2019, for U.S. Appl. No. 14/042,366, of Brock, Z., filed Sep. 30, 2013.
Advisory Action dated Feb. 8, 2019, for U.S. Appl. No. 14/941,020, of Lee, B., filed Nov. 13, 2015.
Examination Report No. 3 for Australian Patent Application No. 2017208387, dated Feb. 11, 2019.
Notice of Allowance dated Mar. 15, 2019, for U.S. Appl. No. 14/941,020 of Lee, B., filed Nov. 13, 2015.
Advisory Action dated Mar. 29, 2019, for U.S. Appl. No. 15/084,390, of Henderson, W., et al., filed Mar. 29, 2016.
Final Office Action dated Jul. 8, 2019, for U.S. Appl. No. 15/445,380, of Brock, Z., filed Feb. 28, 2017.
Notice of Allowance dated Sep. 25, 2019, for U.S. Appl. No. 15/909,005, of Post, D. J., et al., filed Jan. 3, 2018.
Advisory Action dated Sep. 26, 2019, for U.S. Appl. No. 15/445,380, of Brock, Z., filed Feb. 28, 2017.
Non-Final Office Action dated Oct. 30, 2019, for U.S. Appl. No. 15/084,390, of Henderson, W., et al., filed Mar. 29, 2016.
Non-Final Office Action dated Oct. 31, 2019, for U.S. Appl. No. 15/445,380, of Brock, Z., filed Feb. 28, 2017.
Final Office Action dated Apr. 17, 2020, for U.S. Appl. No. 15/445,380, of Brock, Z., filed Feb. 28, 2017.
Notice of Allowance dated May 14, 2020, for U.S. Appl. No. 15/084,390, of Henderson, W., et al., filed Mar. 29, 2016.
Advisory Action dated Jul. 2, 2020, for U.S. Appl. No. 15/445,380, of Brock, Z., filed Feb. 28, 2017.
Notice of Allowance dated Sep. 2, 2020, for U.S. Appl. No. 15/445,380, of Brock, Z., filed Feb. 28, 2017.
Examiner Requisition for Canadian Patent Application No. 2,919,238, dated Nov. 5, 2019.
Examination report for Australian Patent Application No. 2019201310, dated Nov. 25, 2019.
Notice of Acceptance for Australian Patent Application No. 2019201310, dated Jul. 21, 2020.
Notice of Grant for Australian Patent Application No. 2019201310, dated Nov. 12, 2020.
Notice of Allowance for Canadian Patent Application No. 2,919,238, dated Jun. 15, 2021.
Final Office Action dated Apr. 4, 2019, for U.S. Appl. No. 15/909,005, of Post, D. J., et al., filed Jan. 3, 2018.
Advisory Action dated Jun. 17, 2019, for U.S. Appl. No. 15/909,005, of Post, D. J., et al., filed Jan. 3, 2018.
Non-Final Office Action dated Mar. 3, 2022, for U.S. Appl. No. 16/220,094, of Chatterjee, S., et al., filed Dec. 14, 2018.

\* cited by examiner

ESTABLISHING CONSENT FOR CARDLESS TRANSACTIONS USING SHORT-RANGE TRANSMISSION

CROSS REFERENCE TO RELATED APPLICATIONS

This application is a non-provisional of and claims the benefit under 35 U.S.C. § 119(e) of the filing date of U.S. Provisional Patent Application No. 61/719,897, filed on Oct. 29, 2012, entitled "Establishing Consent for Cardless Transactions Using Short-Range Transmission," the entirety of which is herein incorporated by reference.

TECHNICAL FIELD

This disclosure relates to cardless payment transactions.

BACKGROUND

In a conventional point-of-sale electronic credit card transaction, the transaction is authorized and captured. In the authorization stage, a physical credit card with a magnetic stripe is swiped through a merchant's magnetic card reader or a physical credit card with a chip is inserted into a merchant's reader, for example, as part of a point-of-sale device. A payment request is sent electronically from the magnetic card reader to a credit card processor. The credit card processor routes the payment request to a card network, e.g., VISA® or MASTERCARD®, which in turn routes the payment request to the card issuer, e.g., a bank. Assuming the card issuer approves the transaction, the approval is then routed back to the merchant. In the capture stage, the approved transaction is again routed from the merchant to the credit card processor, card network and card issuer, and the payment request can include the cardholder's signature (if appropriate). The capture state can trigger the financial transaction between the card issuer and the merchant, and optionally creates a receipt. There can also be other entities, e.g., the card acquirer, in the route of the transaction. Debit card transactions have a different routing, but also require swiping of the card.

SUMMARY

In one aspect, a method for processing a cardless payment includes receiving, by a first mobile device, a signal from a second mobile device using a short-range wireless transmission protocol. A received signal strength indication of the signal is determined and used to determine whether the first mobile device and the second mobile device are in proximity. Upon receiving the determination of proximity, either consent for a cardless payment transaction is automatically established, or a user is provided the opportunity to express consent for the cardless payment transaction.

In some embodiments, the short-range wireless transmission protocol is Bluetooth or Bluetooth low energy (BLE).

In another aspect, a method for verifying a cardless payment transaction between a merchant and a payer includes receiving an indication of consent by the payer to enter into a cardless payment transaction with the merchant. A token is generated at the payer mobile device, the token including a signature based on a merchant identifier, a payer identifier, a timestamp, or any combination thereof. The token is provided to the merchant mobile device using a short-range wireless data transmission for verification of a transaction between the payer and the merchant.

In some embodiments, the token is provided using Bluetooth low energy, near field communication, or optical codes.

In another aspect, a system includes one or more computers operable to perform the following operations: determining that a payer mobile device and a merchant mobile device are in proximity; receiving an indication of consent by a payer to enter into a cardless payment transaction with a merchant; generating a token including a signature based on a merchant identifier, a payer identifier, a timestamp, or any combination thereof; generating, using the token, a message requesting authentication of the cardless payment transaction between the payer and the merchant; and verifying the authenticity of the transaction by verifying the signature of the token.

BRIEF DESCRIPTION OF DRAWINGS

Like reference numbers and designations in the various drawings indicate like elements.

DETAILED DESCRIPTION

Figure 1:
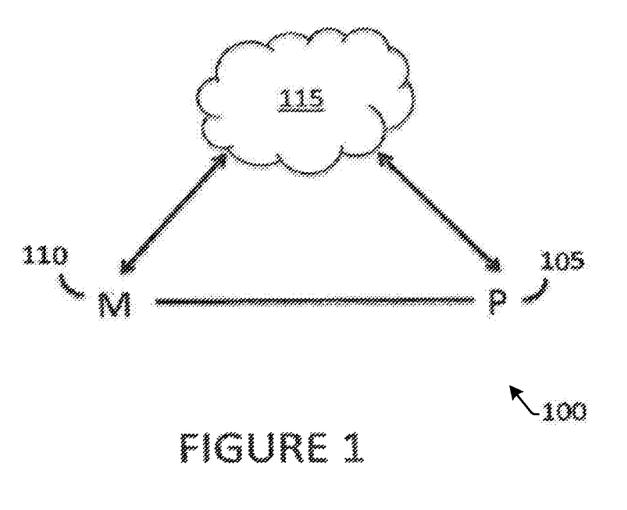
FIG. 1 is a schematic illustration of an example cardless payment system.

FIG. 1 is a schematic illustration of an example cardless payment system 100. The term "cardless payment transaction" as used herein refers to a payment transaction where an account associated with the card can be charged but a card is not physically presented (e.g., a card is not swiped or read). The system includes a mobile device 105 associated with a payer, a mobile device 110 associated with a payee/merchant, and a payment service 115. The payment service 115 can communicate wirelessly with the payer mobile device 105 and/or the merchant mobile device 110. The payer device 105 and the merchant device 110 can communicate and pass signals using a short-range wireless transmission protocol, such as, Bluetooth or Bluetooth low energy (BLE). The merchant 5 device 110 and/or the payer device 105 can send data to the payment service, such as, location data or payment transaction data.

Location data can be used by the payment service 115 to establish payer consent to enter into a cardless payment transaction with a merchant. A payer can establish consent to enter into a cardless payment transaction when the payer device 105 is in proximity (e.g., within a predetermined location) with the merchant device 110. Proximity can be established based on location data, such as, GPS data, Wi-fi data, and/or data from short-range data transmission signals (e.g., Bluetooth or BLE).

After consent is established, the merchant can process a transaction using its mobile device 110 by indicating the goods/services being provided and the amount to be paid under the transaction. For example, the merchant can be a coffee shop and payer can purchase coffee and pastries. The merchant device 110 sends payment transaction data (e.g., details about goods/services, amount to be paid, location of transaction, etc.) to the payment service 115. The payment service 115 processes the transaction for payment on behalf of the merchant by communicating with the receiving and issuing banks. The payment service 115 can post funds to the merchant's account at the receiving bank using the payment service's funds and request payment from the payer's issuing bank for the amount under the transaction.

Figure 2A:
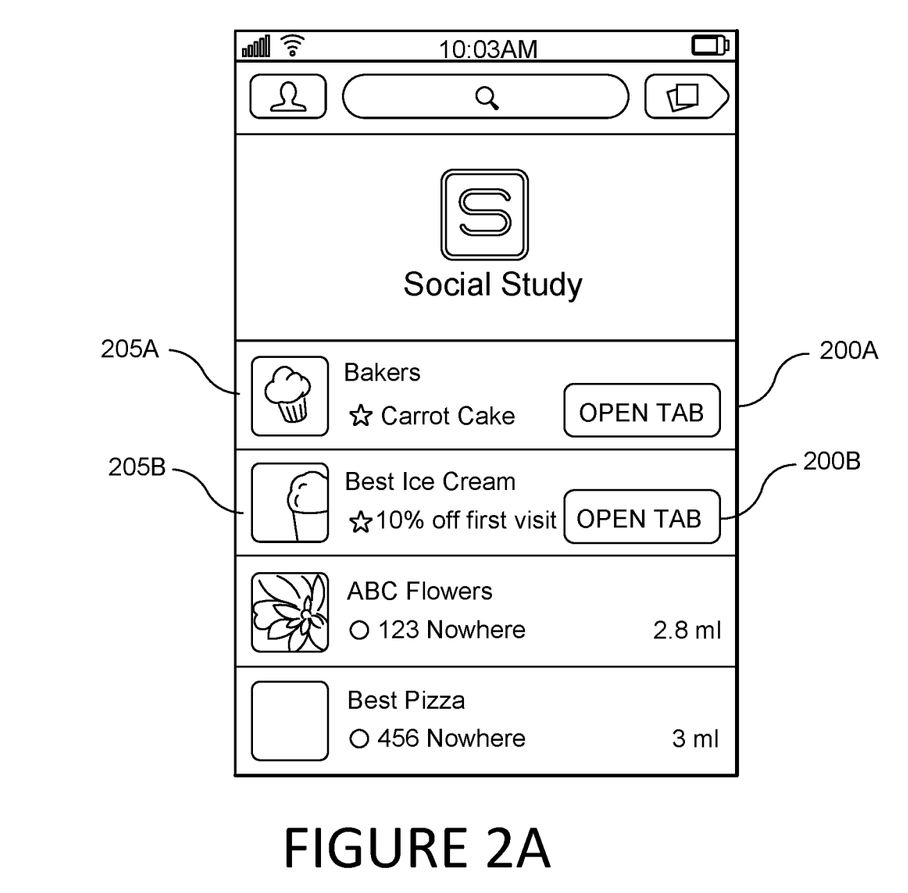
FIGS. 2A-2B show an example user interface used in establishing consent in a cardless payment transaction.
Figure 2B:
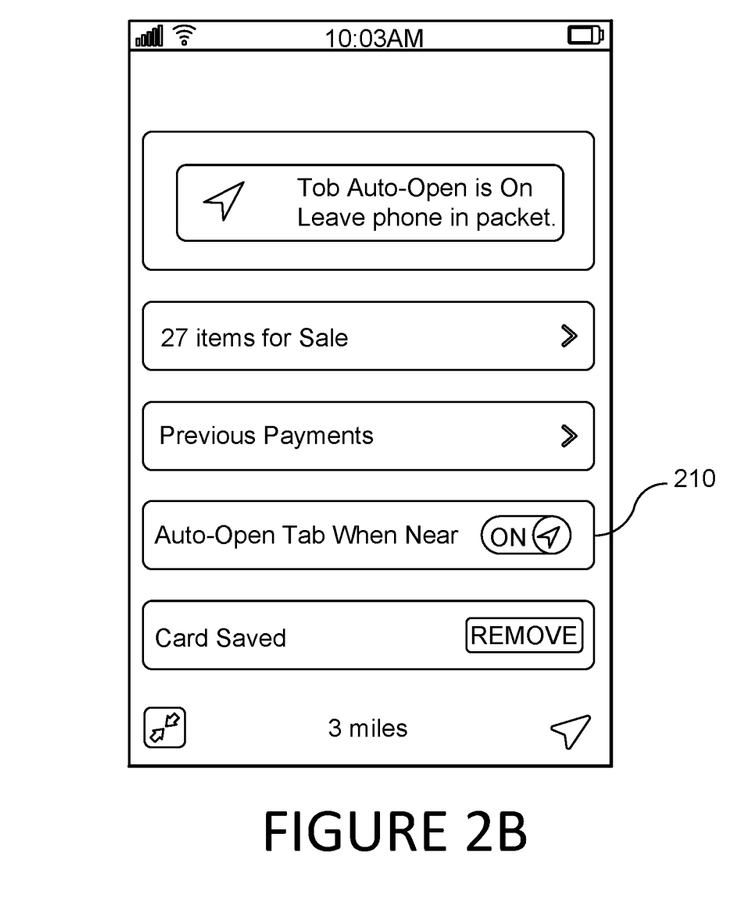

FIGS. 2A-2B show an example user interface for establishing consent in a cardless payment transaction. Payer consent to enter into a cardless payment transaction can be established when a payer device (e.g., the payer device 105 of FIG. 1) and a merchant device (e.g., the merchant device 110 of FIG. 1) are in proximity to one another. In some examples, a payer is given the option to provide consent to a payment service when the payer is in proximity with a merchant. FIG. 2A shows an example user interface allowing a payer user to establish consent when the payer is in proximity with a merchant. When the payer device is in proximity with the merchant device, the payment service can provide an interactive element displayed on a mobile application running on the payer device, allowing a payer user to establish consent. The example interface displays interactive elements 200A or 200B that allow a user to "open a tab" associated with a merchant 205A or 205B via a gesture based input, thereby providing the payment service an indication of consent to enter into a cardless payment transaction with the particular merchant.

In another example, the payment service automatically determines that there is consent to enter into the cardless payment transaction when the payer device is in sufficient proximity with the merchant device. FIG. 2B shows an example user interface allowing a payer user to authorize automatic consent when the payer is in proximity with a merchant. The interface can include an interactive element 210. A payer user can interact with the element 210 (e.g., via a gesture based input) indicating to the payment service that consent is to be automatically established when the payer's device is in proximity with a merchant's device.

Figure 3:
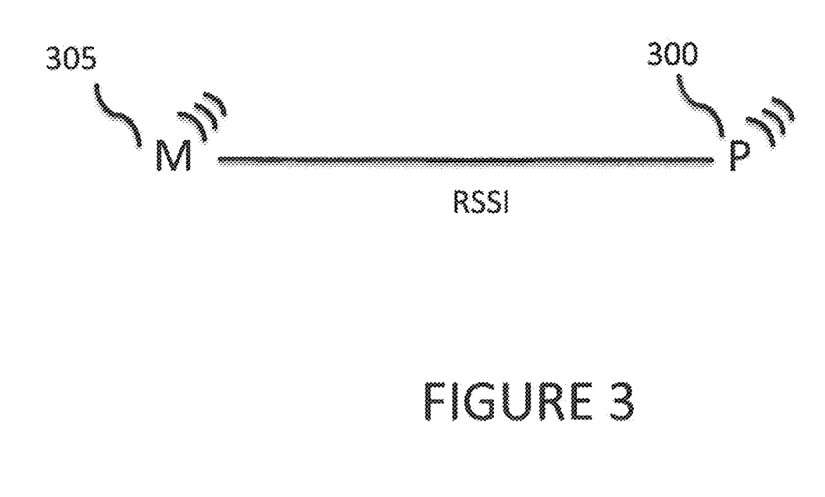
FIGS. 3-6 illustrate example processes for establishing proximity and consent in a cardless payment transaction using short-range wireless transmission.

FIGS. 3-6 show example processes for establishing proximity based consent in a cardless payment transaction using short-range wireless data transmission. FIG. 3 shows a payer device 300 and a merchant device 305 that communicate using a short-range wireless transmission protocol, such as Bluetooth or BLE. Payer device 300 can broadcast a signal received by merchant device 305. A measurement of proximity of the payer device 300 to the merchant device 305 can be determined based on a received signal strength indication (RSSI) of the signal passed between the merchant device 305 and the payer device 300. For example, a payment service (e.g., payment service 115 of FIG. 1) can determine that the merchant and payer are in sufficient proximity to one another to trigger payer consent when the RSSI exceeds a predetermined threshold value. If the payment service determines that the payer and merchant are sufficiently in proximity with one another, the payment service can provide the payer device 300 with an option for the user to establish consent (e.g., as described in FIG. 2A) or automatically establish consent (e.g., as described in FIG. 2B).

Figure 4:
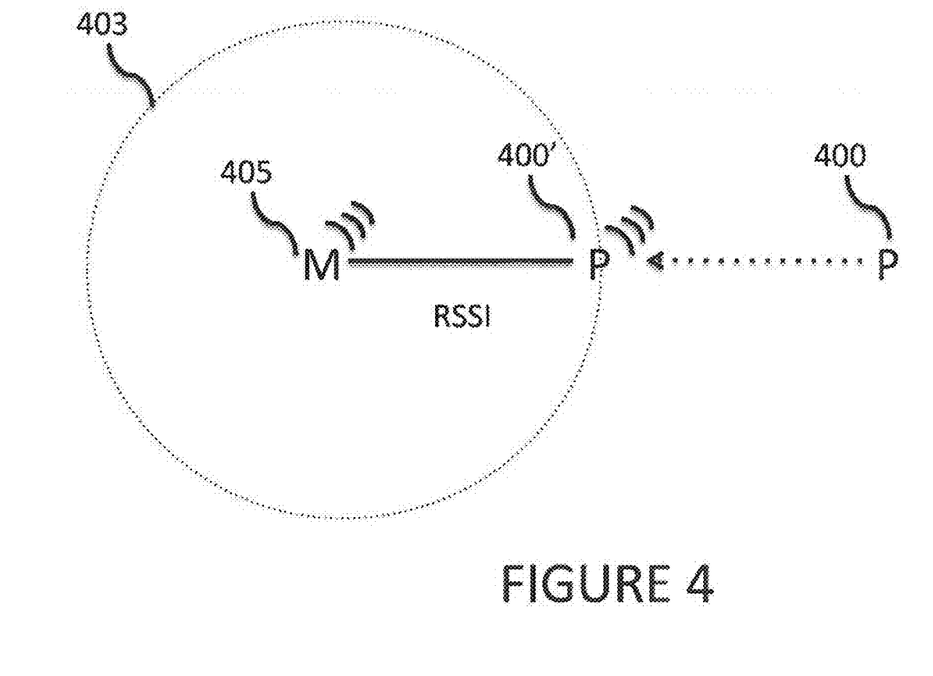

In some examples, the payer device may be triggered/prompted to use a short-range wireless data transmission (e.g., Bluetooth, BLE), if certain conditions are satisfied. Reasons for limiting the time during which a device runs Bluetooth or BLE can include, for example, extending battery life of the device. FIG. 4 shows an example of using geofencing to trigger a device to run a short-range wireless signal process. The payer device 400 as shown in FIG. 4 is not running short-range wireless data transmission processes (e.g., is not broadcasting/running Bluetooth or BLE). Once the payer device 400' enters a geofence 403 around merchant device 405, an instruction triggers/prompts the payer device 400' to begin running short-range wireless processes (e.g., run Bluetooth/BLE). A measure of proximity for consent can be determined based on a RSSI for the short-5 range wireless signal between payer device 400' and merchant device 405. If the RSSI exceeds a predetermined threshold, the payment service determines that the merchant and payer are sufficiently in proximity with one another, and can provide the payer device 400' with an option for the user to establish consent (e.g., as described in FIG. 2A) or automatically establish consent (e.g., as described in FIG. 2B).

Figure 5:
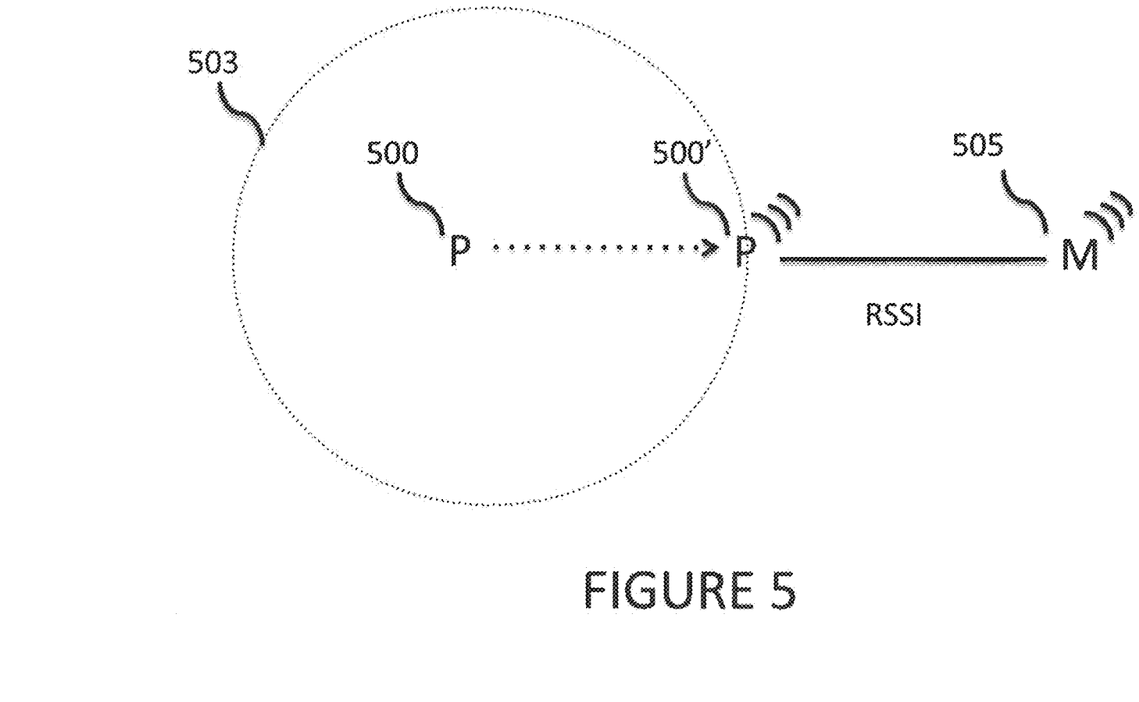

FIG. 5 shows another example of using geofencing to trigger or prompt a mobile device to run short-range wireless data transmission processes. A geofence 503 can be established around payer device 500. When the payer device 500' exits the geofence 503, the device 500' is triggered/prompted to start running a short-range wireless process (e.g., starts running Bluetooth or BLE). A RSSI for a short-range wireless signal (e.g., a Bluetooth or BLE signal) between the payer device 500' and a merchant device 505 can then be used to determine whether the devices are sufficiently in proximity to establish consent. If the RSSI exceeds a predetermined threshold, the payment service determines that the merchant and payer are sufficiently in proximity with one another, and can provide the payer device 500' with an option for the user to establish consent (e.g., as described in FIG. 2A) or automatically establish consent (e.g., as described in FIG. 2B).

Figure 6:
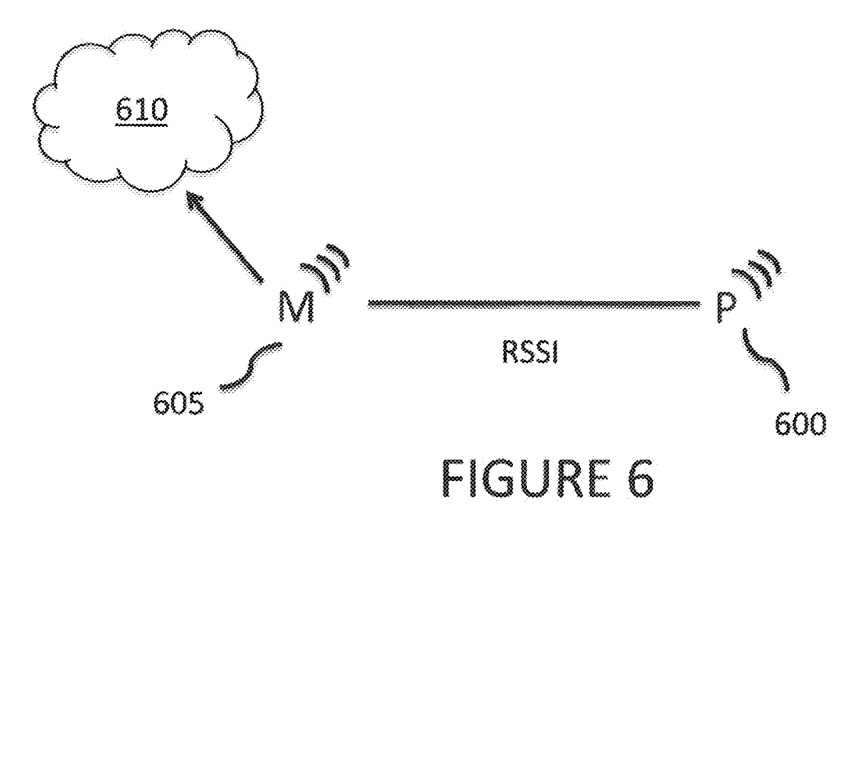

FIG. 6 shows an example where a payer device 600 communicates with a merchant device 605 using short-range wireless communication (e.g., Bluetooth or BLE. In some examples, merchant device 605 communicates with the payment service 610 acting, in part, as a conduit for the payer device 600 by sending information/data from payer device 600 (e.g., if the payer device 600 is offline). Either one of the merchant device 605 or payer device 600 can broadcast and/or read short-range wireless signals (e.g., broadcasting or reading Bluetooth or BLE signals). Merchant device 605 can communicate with the payment service 610 to determine whether the devices are sufficiently in proximity with one another to establish consent based on an RSSI of a short-range wireless signal.

Different techniques can be used to address security of information/data being passed between payer device 600 and merchant device 605. For example, a payer device 600 can exchange a certificate with a merchant device 605 that can be used to encrypt the data. A payer device 600 could also have a token that can be used to encrypt the data. The token can be single use (e.g., expires after use in a payment transaction). The payer device 600 can also have a seed value that based on its last connection with the server of the payment service. The seed can be used to generate values used for encryption. In some examples, the token is merchant-specific where a payer/customer has a pre-existing relationship with the payee/merchant (e.g., the payer saved a merchant card to their favorites). In one embodiment, the payer mobile device 600 generates a single-use key by digitally signing various factors about the transaction (e.g., merchant ID, payer ID, and timestamp). The key can be used to authorize a transaction between the payer and the merchant for a limited period of time (e.g., expires if is not used after a period of time). The key can be transmitted from the payer mobile device 600 to the merchant mobile device 605 via optical (e.g., QR) code and/or short-range data transmission (e.g., BLE, NFC). The merchant device 605 can transmit the key to the back-end payment service 610 as part of a transaction authorization message request. The back-end payment service 610 can verify the authenticity of the transaction by verifying the signature of the key.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on a non-transitory computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable a receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language resource), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending resources to and receiving resources from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components.

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

Thus, particular embodiments of the subject matter have been described. Other embodiments are within the scope of the following claims.

What is claimed is:

1. A method comprising:
receiving, by an application running on a mobile device, an indication of consent for conducting cardless payment transactions using the mobile device and a merchant device when a condition is satisfied, wherein the indication of consent is received through an interactive element selected on an interface of the application running on the mobile device;
determining, by the application and while the application is running in a background on the mobile device and a component that implements short-range wireless transmission protocols is disabled, that the mobile device is within a threshold distance of the merchant device, wherein a buyer associated with the mobile device and a merchant associated with the merchant device each have a respective account with a payment service provider, each respective account including respective financial information of the buyer or the merchant allowing the payment service provider to process cardless payment transactions using the mobile device and the merchant device;
determining, by the application and while the application is running in the background on the mobile device, a short-range wireless transmission protocol for communication based at least in part on determining that the mobile device is within the threshold distance of the merchant device;
automatically and without input from the buyer, enabling the component that implements short-range wireless transmission protocols to utilize the short-range wireless transmission protocol;
receiving, by the application running on the mobile device, a signal from the merchant device using the short-range wireless transmission protocol;
determining, by the application running on the mobile device, that the mobile device and the merchant device are in proximity if the received signal satisfies a threshold, the condition being that the received signal satisfies the threshold; and
based at least in part on determining that the mobile device and the merchant device are in proximity of one another, automatically transmitting, by the application running on the mobile device, the indication of consent to the payment service provider for processing a cardless payment transaction with the merchant device without exchange of financial information between the buyer and the merchant associated with the mobile device and the merchant device, wherein the cardless payment transaction is based on a time-limited encrypted digital key exchanged between the mobile device and the merchant device using the short-range wireless transmission protocol.

2. The method of claim 1, wherein the short-range wireless transmission protocol includes at least one of Bluetooth or Bluetooth low energy (BLE).

3. The method of claim 1, wherein the threshold distance comprises a geofence located around the merchant device.

4. A system comprising:
one or more processors; and
one or more non-transitory computer storage media storing instructions that, when executed by the one or more processors, cause the one or more processors to:
receive an indication of consent for conducting cardless payment transactions using a first device and a second device when a condition is satisfied, wherein the indication of consent is received through an interactive element on an application running on the first device;
determine, while the application is running in a background on the first device and a component that implements short-range wireless transmission protocols is disabled, that a first device is within a threshold distance of the second device, wherein a buyer associated with the first device and a merchant associated with the second device each have a respective account with a payment service provider, each respective account including respective financial information of the buyer or the merchant allowing the payment service provider to process cardless payment transactions using the first device and the second device;

determine, while the application is running in the background on the first device, a short-range wireless transmission protocol for communication based at least in part on determining that first device is within the threshold distance of the second device;

enable, based at least in part on determining that the first device is within the threshold distance of the second device and without input from the buyer, the component that implements short-range wireless transmission protocols, to utilize the short-range wireless transmission protocol;

receive a signal using the short-range wireless transmission protocol;

determine that the first device and the second device are in proximity if the received signal satisfies a threshold, the condition being that the received signal satisfies the threshold; and based at least in part on determining that the first device and the second device are in proximity of one another, automatically transmit the indication of consent to the payment service provider for processing a cardless payment transaction with the second device without exchange of financial information between the buyer and the merchant associated with the first device and the second device, wherein the cardless payment transaction is based on a time-limited encrypted digital key exchanged between the first device and the second device using the short-range wireless transmission protocol.

5. The system of claim 4, wherein the short-range wireless transmission protocol includes at least one of Bluetooth or Bluetooth low energy (BLE).

6. The system of claim 4, wherein the threshold distance comprises a geofence located around the second device.

7. One or more non-transitory computer storage media comprising instructions that, when executed by one or more processors, cause the one or more processors to:

receive an indication of consent for conducting cardless payment transactions using a first device and a second device when a condition is satisfied, wherein the indication of consent is received through an interactive element on an application running on the first device;

determine, while the application is running in a background on the first device and a component that implements short-range wireless transmission protocols is disabled, that a first device is within a threshold distance of the second device, wherein a buyer associated with the first device and a merchant associated with the second device each have a respective account with a payment service provider, each respective account including respective financial information of the buyer or the merchant allowing the payment service provider to process cardless payment transactions using the first device and the second device;

determine, while the application is running in the background on the first device, to utilize a short-range wireless transmission protocol based at least in part on determining that first device is within the threshold distance of the second device;

enable, based at least in part on determining that the first device is within the threshold distance of the second device and without input from the buyer, the component that implements short-range wireless transmission protocols, to utilize the short-range wireless transmission protocol;

receive a signal using the short-range wireless transmission protocol;

determine that the first device and the second device are in proximity if the received signal satisfies a threshold, the condition being that the received signal satisfies the threshold; and based at least in part on determining that the first device and the second device are in proximity of one another, automatically transmit the indication of consent to the payment service provider for processing a cardless payment transaction with the second device without exchange of financial information between the buyer and the merchant associated with the first device and the second device, wherein the cardless payment transaction is based on a time-limited encrypted digital key exchanged between the first device and the second device using the short-range wireless transmission protocol.

8. The one or more non-transitory computer storage media of claim 7, wherein the execution of the instructions by the one or more processors, further cause the one or more processors to:

determine a geolocation of the first device based at least in part on location data from a location sensor of the first device;

wherein determining that the first device is within the threshold distance of the second device is based at least in part on the location data.

* * * * *